(12) United States Patent
Hu et al.

(10) Patent No.: US 10,171,639 B2
(45) Date of Patent: Jan. 1, 2019

(54) SUSPENSION DEVICE AND ELECTRONIC DEVICE USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jian-Dong Hu, Shenzhen (CN); Zhi-Jun Shi, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 21 days.

(21) Appl. No.: 15/458,090

(22) Filed: Mar. 14, 2017

(65) Prior Publication Data

US 2017/0272560 A1   Sep. 21, 2017

(30) Foreign Application Priority Data

Mar. 15, 2016   (CN) .......................... 2016 1 0144675

(51) Int. Cl.
*H04M 1/04* (2006.01)
*A45F 5/00* (2006.01)
*A45C 11/00* (2006.01)

(52) U.S. Cl.
CPC .............. *H04M 1/04* (2013.01); *A45C 11/00* (2013.01); *A45F 5/00* (2013.01); *A45C 2011/002* (2013.01); *A45F 2005/006* (2013.01)

(58) Field of Classification Search
CPC .... H04M 1/04; A45C 11/00; A45C 2011/002; A45C 2005/006; A45F 5/00
See application file for complete search history.

(56) References Cited

U.S. PATENT DOCUMENTS

| 8,371,486 B2* | 2/2013 | Imafuku | A45F 5/004 16/405 |
| 8,408,513 B2* | 4/2013 | Smith | A45C 13/30 224/258 |
| 2013/0094660 A1* | 4/2013 | Weinstein | H04R 1/10 381/74 |

FOREIGN PATENT DOCUMENTS

WO   WO 01/43491 A1 *  6/2001

* cited by examiner

*Primary Examiner* — Nay A Maung
*Assistant Examiner* — Angelica M Perez
(74) *Attorney, Agent, or Firm* — ScienBiziP, P.C.

(57) ABSTRACT

An electronic device with extendable strap and different communication modes depending on the state of the strap comprises a shell, at least one rotating mechanism, a strap, a sensor, and a processor. The shell defines at least one first receiving cavity, the rotating mechanism is received in the first receiving cavity. One end of the strap is wound on the at least one rotating mechanism. The rotating mechanism is able to rotate and store spring force under a driving of the strap. The sensor communicates with the processor to determine the state of the strap according to a rotation direction of the rotating mechanism and thus determine whether the strap is retracted to allow touch screen input by a user, or extended to switch to voice communication with the user.

14 Claims, 6 Drawing Sheets

SUSPENSION DEVICE AND ELECTRONIC DEVICE USING THE SAME

CROSS-REFERENCE TO RELATED APPLICATIONS

This application claims priority to Chinese Patent Application No. 201610144675.2 filed on Mar. 15, 2016, the contents of which are incorporated by reference herein.

FIELD

The subject matter herein generally relates to a suspension device and an electronic device using the same.

BACKGROUND

Smart phone is popular. However, when holding and focusing on smart phone, the surrounding environment can be ignored, causing danger to people.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" indicates "including, but not necessarily limited to"; it specifically indicates open-ended inclusion or membership in a so-described combination, group, series and the like.

Embodiments of the present disclosure will be described in relation to the accompanying drawings.

Figure 1:
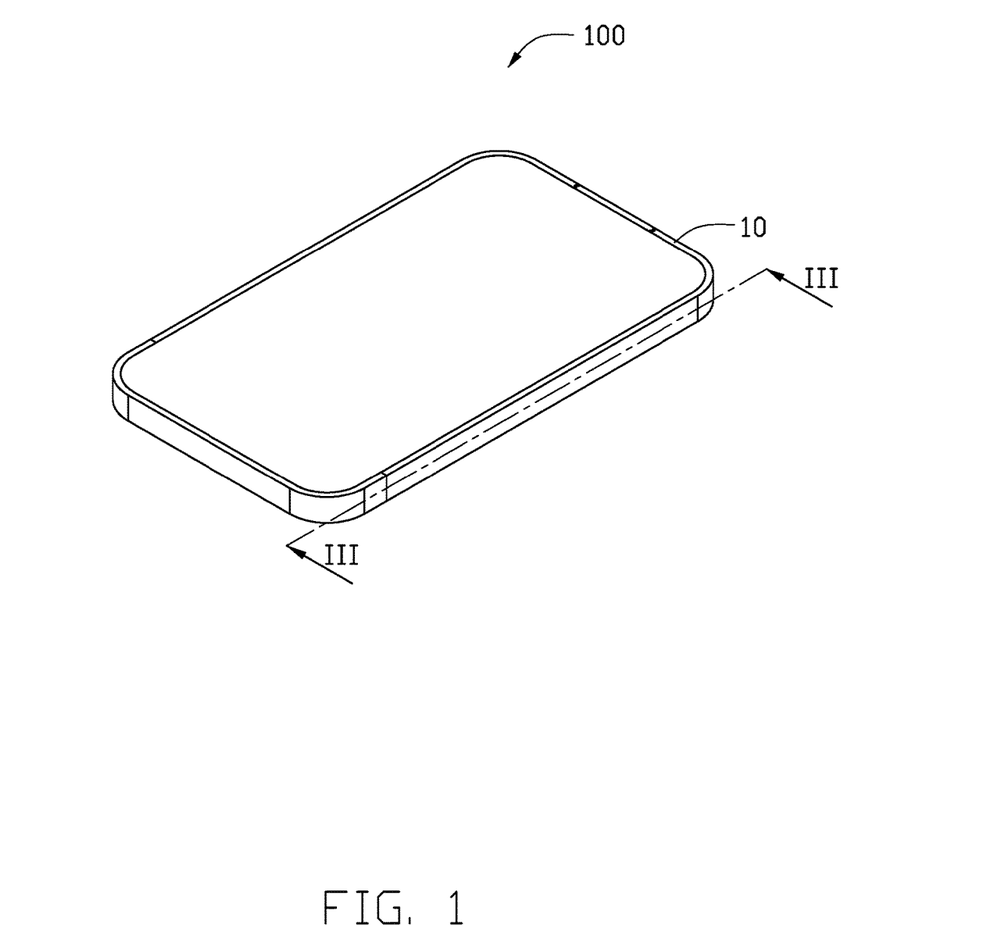
FIG. 1 is an isometric view showing an exemplary embodiment of a suspension device.
Figure 2:
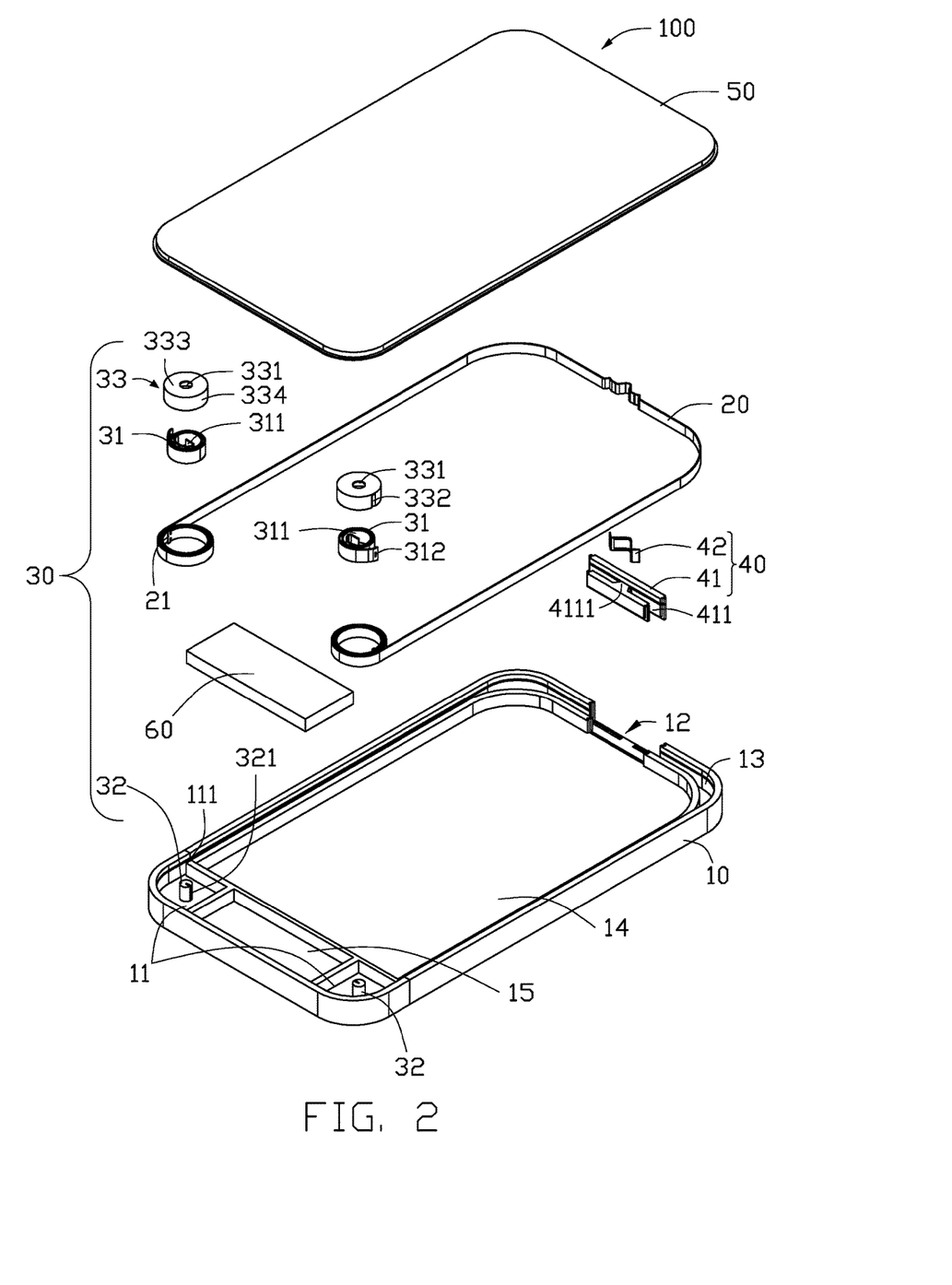
FIG. 2 is an exploded view showing the suspension device of FIG. 1.

FIG. 1 illustrates an exemplary embodiment of a suspension device 100. The suspension device 100 is used to carry an object, such as an electronic device. FIG. 2 illustrates an exploded view of the suspension device 100 of FIG. 1. The suspension device 100 includes a shell 10, a strap 20, and at least one rotating mechanism 30. The shell 10 defines at least one first receiving cavity 11 therein. The first receiving cavity 11 is used to receive the rotating mechanism 30. The at least one first receiving cavity 11 has a first hole 111. The first hole 111 is set in a side wall of the first receiving cavity 11. The strap 20 is able to pass through the side wall of the first receiving cavity 11 via the first hole 111. A first opening 12 is also set on the side wall of the first receiving cavity 11. The strap 20 passes through the first opening 12 and is exposed in the first opening 12, for convenient use of the strap 20.

One end of the strap 20 is wound on the rotating mechanism 30, the other end of the strap 20 passes through the first hole 111 and the first opening 12 to connect with the shell 10. When pulled, the strap 20 is able to drive the rotating mechanism 30 to rotate thus releasing the full length of the strap 20.

In at least one embodiment, the number of first receiving cavities 11 and rotating mechanisms 30 is two. Each rotating mechanism 30 is received in one first receiving cavity 11. One end of the strap 20 is wound on one rotating mechanism 30, and the other end, opposite to the aforesaid end, of the strap 20 is wound on another rotating mechanism 30. Initially, the strap 20 is received in the suspension device 100. When the strap 20 is stretched out of the suspension device 100 or is retracted, rotating directions of the two rotating mechanisms 30 are opposite to each other.

When pulled out, the strap 20 drives the rotating mechanisms 30 to jointly rotate, and store energy. When no longer pulled, the rotating mechanisms 30 release the energy and retract the strap 20 to its initial state.

The rotating mechanism 30 includes a coil spring 31 and a shaft 32. The shaft 32 is defined in the first receiving cavity 11. A first end of the coil spring 31 is fixed on the shaft 32 and the coil spring 31 is wound on the shaft 32. The second end of the coil spring 31 is connected with one end of the strap 20 and the strap 20 is wound on the coil spring 31.

Figure 4:
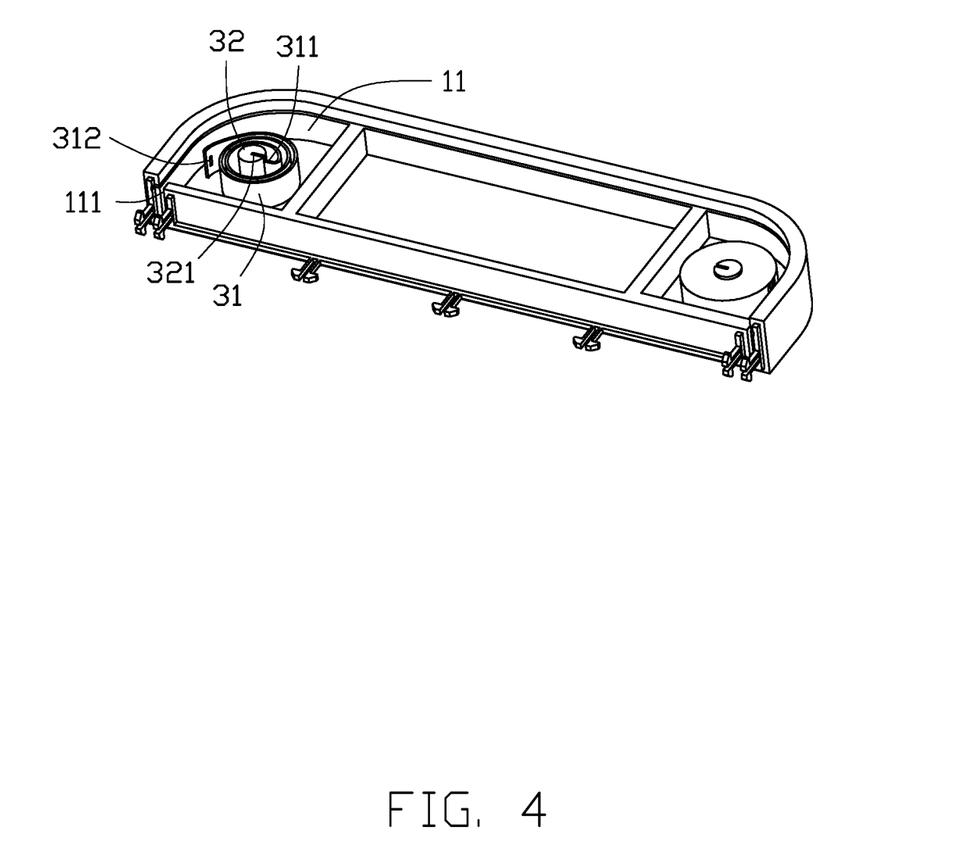
FIG. 4 is an isometric view showing an exemplary embodiment of a rotating mechanism of the suspension device.

FIG. 4 illustrates the rotating mechanism 30 of the suspension device 100. In the present exemplary embodiment, the first end of the coil spring 31 is flat (hereinafter, this portion of spring 31 is "sheet metal 311"). The shaft 32 defines a second opening 321. The sheet metal 311 is received in the second opening 321. The coil spring 31 passes through the second opening 321 and is wound on the shaft 32. The second end of the coil spring 31 defines a third hole 312. The two ends of the strap 20 each defines a buckle 21 (referring to FIG. 2). The buckles 21 of the strap 20 are secured to the third hole 312 of each of the coil springs 31, thus causing the strap 20 to connect to the second end of each of the coil springs 31. In at least one embodiment, the buckle 21 is a hard rod. The process of the buckle 21 being secured in the third hole 312 is that, as the strap 20 is soft material, the strap 20 first passes along a first direction. The buckle 21 is attached to the third hole 312 along a second direction perpendicular to the first direction. In another embodiment, the first end of the coil spring 31 defines a convex block (not shown), and the shaft 32 defines a receiving hole (not shown) and the second opening 321. The receiving hole is connected to the second opening 321. The diameter of the receiving hole is slightly greater than the diameter of the convex block, and the diameter of the second opening 321 is less than the diameter of the convex block. The convex block is received and bound in the receiving hole. The coil spring 31 passes through the second opening 321 and is wound on the shaft 32.

The rotating mechanism 30 further includes a coil spring cover 33. The coil spring cover 33 is a hollow cylindrical body. The coil spring cover 33 includes a top part 333 and a side wall 334. The side wall 334 vertically extends from the top part 333. The top part 333 of the coil spring cover 33 defines a fourth hole 331. The side wall 334 of the coil spring cover 33 defines a third opening 332. The shaft 32 passes through the fourth hole 331. The coil spring cover 33 covers the coil spring 31. The strap 20 is wound on the coil spring 31 and passes through the coil spring cover 33 via the third opening 332.

Figure 3:
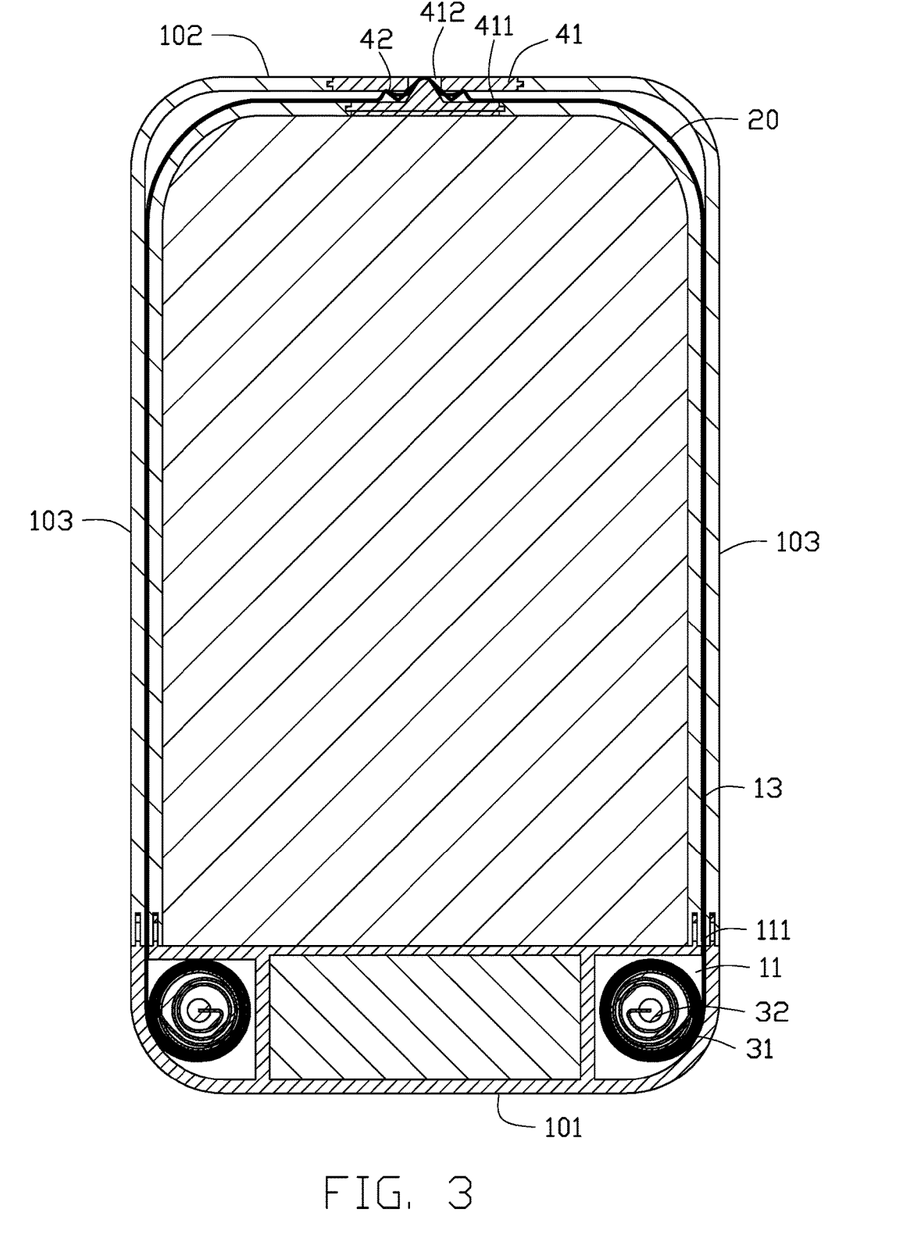
FIG. 3 is a sectional view of the suspension device of FIG. 1 along the III-III line.

The shell 10 defines a limiting groove 13. The limiting groove 13 is located between the first hole 111 and the first opening 12. The limiting groove 13 receives the strap 20 and restricts the moving direction of the strap 20. In at least one embodiment, the shell 10 includes a bottom part 101, a top part 102 opposite to the bottom part 101 and two side walls 103 located between the bottom part 101 and the top part 102, as shown in FIG. 3. The two first receiving cavities 11 are set on top sides of the bottom part 101 of the shell 10. The first opening 12 is set on the top part 102 of the shell 10. The limiting groove 13 is located between two side walls 102 of the shell 10, by which the first receiving cavity 11 is connected to the first opening 12.

A limiting mechanism 40 is defined in the first opening 12. The limiting mechanism is used to limit the extent or amount of the strap 20 passing through the first opening 12. The limiting mechanism 40 includes a limiting block 41 and an elastic sheet 42. The limiting block 41 defines a receiving slot 411 and a second hole 412. The second hole 412 is set on the first side wall of the receiving slot 411. The elastic sheet 42 is received in the receiving slot 411. The strap 20 passes through the receiving slot 411 and is resisted on the inner wall of the receiving slot 411 by the elastic sheet 42. Both the elastic sheet 42 and the strap 20 are partially located outside of the second hole 412, which is convenient for a user to operate. In at least one embodiment, the elastic sheet 42 has a "W" shaped symmetrical structure. The second side wall of the receiving slot 411 defines a raised part 4111. The raised part 4111 is used to support the elastic sheet 42 and make the elastic sheet 42 stretch out of the second hole 412.

Figure 5:
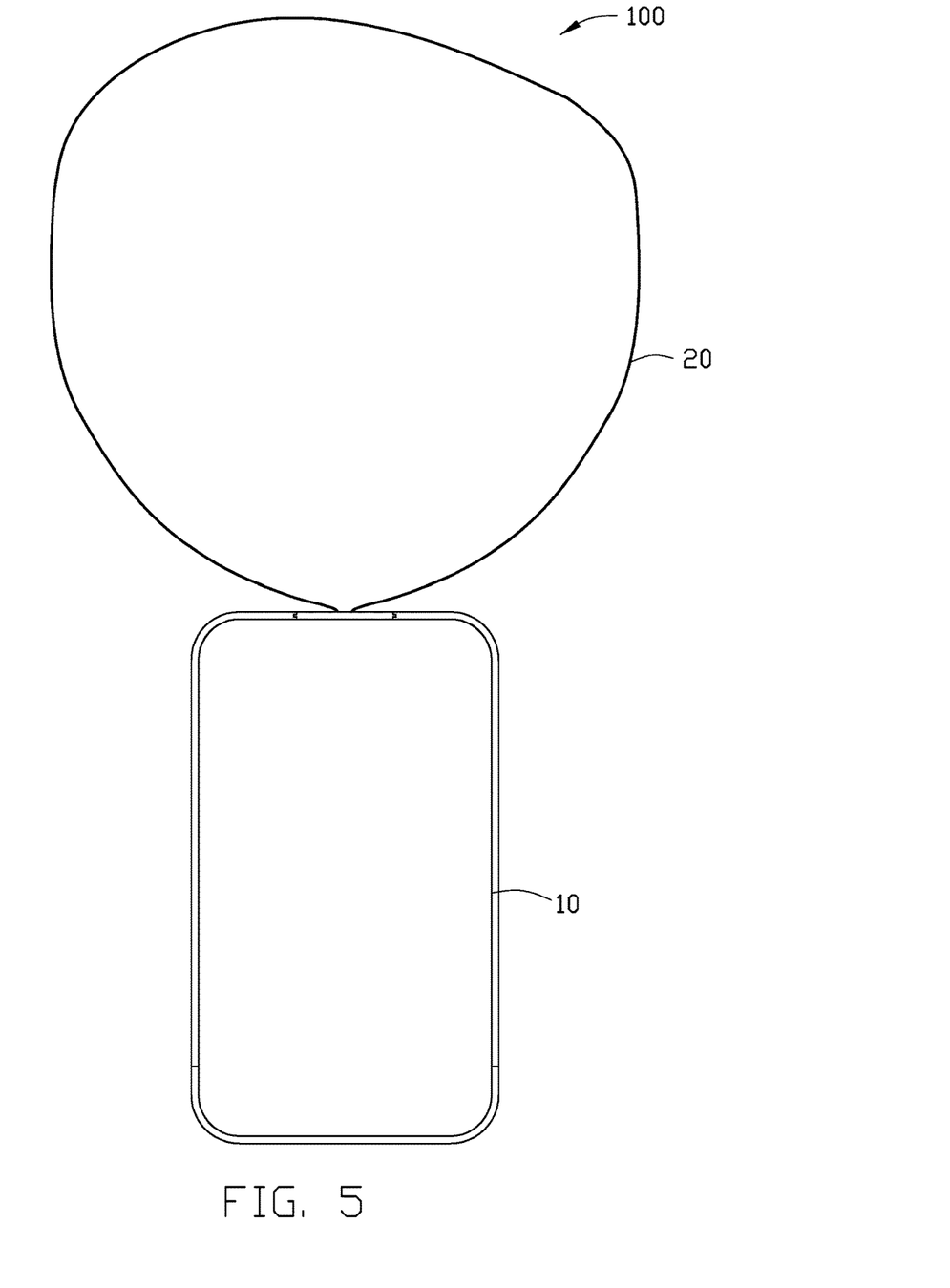
FIG. 5 is an isometric view showing an exemplary embodiment of the suspension device when suspended.

When a user presses on the elastic sheet 42 through the second hole 412, the elastic sheet 42 is compressed and a gap appears between the elastic sheet 42 and the receiving slot 411. When the user pulls the strap 20, the coil spring 31 is driven to jointly rotate by the strap 20 and to store energy. The strap 20 is released as required, thus the user can conveniently support the suspension device 100. FIG. 5 illustrates an embodiment of the suspension device 100 when suspended. When the user pulls the strap 20 to an appropriate length and releases the elastic sheet 42, the elastic sheet 42 again resists on the inner wall of the receiving slot 411, thus the strap 20 is limited between the elastic sheet 42 and the receiving slot 411. The strap 20 fails to be pulled by a user and to be wound on the coil spring 31. Therefore, the suspension device 100 is able to restrict the length of the strap 20 to a length desired by user. The suspension device 100 can thus be hung around the user's neck or user's wrist. When the strap 20 stretches out the second hole 412 and the user presses on the elastic sheet 42, the coil spring 31 releases the stored energy and rewinds on the shaft 32 under the elastic force of the coil spring 31.

Referring to FIG. 2, the suspension device 100 includes a cover 50. The cover 50 covers the shell 10.

Figure 6:
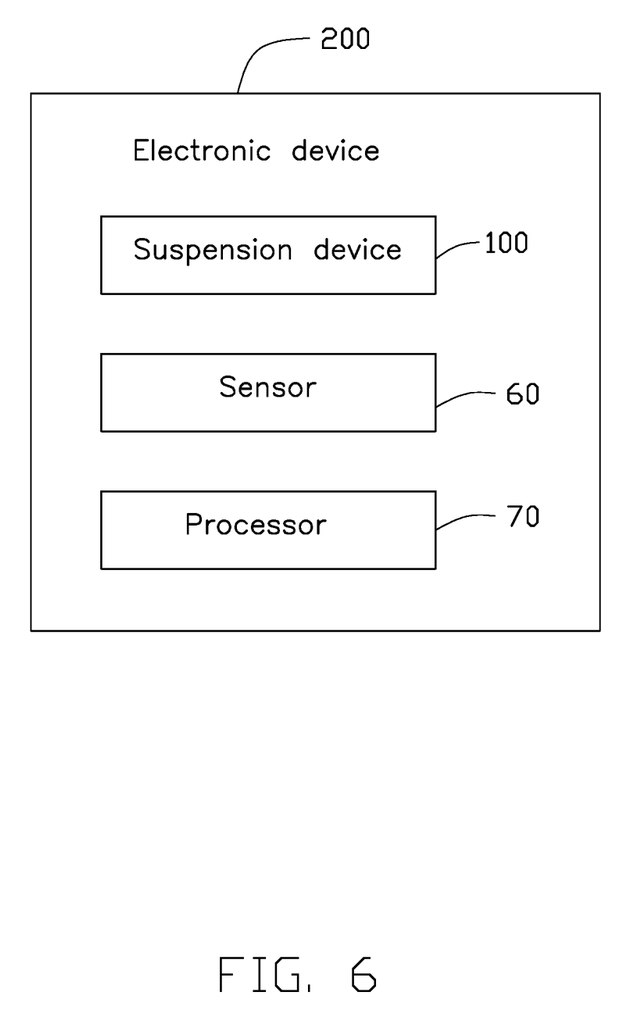
FIG. 6 is a block diagram showing an exemplary embodiment of an electronic device using the suspension device.

FIG. 6 illustrates a block diagram showing an exemplary embodiment of an electronic device 200. In at least one embodiment, the electronic device 200 can be a smart phone or a tablet, for example. The electronic device 200 includes a sensor 60 and a processor 70. The shell 10 also defines a second receiving cavity 14 and a third receiving cavity 15, as shown in FIG. 2. Referring to FIG. 2, the third receiving cavity 15 is located between the two first receiving cavities 11. The third receiving cavity 15 is used to receive the sensor 60. The second receiving cavity 14 connects to the third receiving cavity 15 and the two first receiving cavity 11 and is used to receive some internal components of the electronic device 200, such as a battery and the processor 70. In another embodiment, the second receiving cavity 14 is used to receive the electronic device 200. The sensor 60 is used to sense the state of the strap 20. In at least one embodiment, the sensor 60 determines the state of the strap 20 according to the rotation direction of the coil spring 31. When the sensor 60 detects that the left hand coil spring 31 rotating along the counterclockwise and the right hand coil spring 31 rotating clockwise, the sensor 60 determines the strap 20 as being pulled. Conversely, when the sensor 60 detects the left hand coil spring 31 rotating clockwise and the right hand coil spring 31 rotating counterclockwise, the sensor 60 determines the strap 20 as being in a retracting state.

In at least one embodiment, the shell 10 is a protective shell to protect the electronic device 200. The sensor 60 communicates with the electronic device 200 and sends data as to the state of the strap 20 to the electronic device 200. When receiving the state of the strap 20, the electronic device 200 switches input mode according to the state of the strap 20. The communication between the sensor 60 and the electronic device 200 can be by cable or wirelessly.

The shell 10 can be a housing of the electronic device 200. The cover 50 can be a display of the electronic device 200. The sensor 60 communicates with the processor 70 and sends data as to the state of the strap 20 to the processor 70. The processor 70 changes the input mode of the electronic device 200 according to the state of the strap 20. The processor 70 can be a central processing unit (CPU), a microprocessor, or other data processor chip that performs functions for changing the input mode.

The processor 70 of the electronic device 200 can change the input mode in certain ways. When the strap 20 is in the tensile state, the user is deemed to be busy and has no spare time to view the electronic device 200. In this situation, the processor 70 changes the input mode of the electronic device 200 to a full speech mode. The full speech mode of the electronic device 200 allows the user to communicate with the electronic device 200 by spoken words. In at least one embodiment, a user can input speech, and listen to output responses, by a wired headset or BLUETOOTH headset. When the strap 20 is in the shrinkage state, the user is assumed to require to view the electronic device 200, the processor 70 changes the input mode of the electronic device 200 from the full speech mode to a character input mode.

The electronic device 200 being in the full speech mode makes the user communicate with the electronic device 200 by speech, thus allowing the user to be become hands free.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure, up to and including the full extent established by the broad general meaning of the terms used in the claims.

What is claimed is:

1. A suspension device, comprising:
a shell comprising a bottom part and a top part opposite to the bottom part, the bottom part defining a first receiving cavity, the first receiving cavity defining a side wall, the side wall defining a first hole, the top part defining a first opening;
a first rotating mechanism received in the first receiving cavity; and
a strap configured to connect to the first rotating mechanism, wherein the strap comprises a first end and a second end, the first end of the strap is wound on the first rotating mechanism, the second end of the strap passes through the first hole and the first opening to connect with the shell, under a driving of the strap, the first rotating mechanism rotates and store a spring force,
wherein, the suspension device further comprises a limiting mechanism configured to limit the extent or amount of the strap passing through the first opening, the limiting mechanism is defined in the first opening, the limiting mechanism comprises a limiting block and an elastic sheet, the limiting block defines a receiving slot and a second hole, the elastic sheet has a "W" shape symmetrical structure and is received in the receiving slot, the strap passes through the receiving slot and is resisted on inner wall of the receiving slot by the elastic sheet, both the elastic sheet and the strap are partially located outside of the second hole.

2. The suspension device according to claim 1, further comprising another first receiving cavity and a second rotating mechanism, each of the first and second rotating mechanisms is received in a corresponding one of the first and the another first receiving cavities, the first end of the strap is wound on the first rotating mechanism, and the second end of the strap is wound on the second rotating mechanism.

3. The suspension device according to claim 1, wherein, the first rotating mechanism comprises a coil spring and a shaft, the shaft is defined in the first receiving cavity, the coil spring comprises a first end and a second end, the first end of the coil spring is fixed on the shaft and the coil spring is wound on the shaft, the second end of the coil spring is connected with one of the first and second ends of the strap and the strap is wound on the coil spring.

4. The suspension device according to claim 3, wherein, the first end of the coil spring defines a sheet metal, the shaft defines a second opening, the sheet metal is received in the second opening, the coil spring passes through the second opening and is wound on the shaft.

5. The suspension device according to claim 1, wherein, the shell defines a limiting groove, the limiting groove is located between the first hole and the first opening, the limiting groove is configured to receive the strap and restrict the moving direction of the strap along the limiting groove.

6. The suspension device according to claim 1, wherein, the shell can be a housing, the shell defines a second receiving cavity, the second receiving cavity is configured to receive an electronic device.

7. An electronic device comprising:
a suspension device, comprising:
a shell comprising a bottom part and a top part opposite to the bottom part, the bottom part defining a first receiving cavity, the first receiving cavity defining a side wall, the side wall defining a first hole, the top part defining a first opening;
a first rotating mechanism received in the first receiving cavity;
a strap configured to connect to the first rotating mechanism, wherein the strap comprises a first end and a second end, the first end of the strap is wound on the first rotating mechanism, the second end of the strap passes through the first hole and the first opening to connect with the shell, under a driving of the strap, the first rotating mechanism rotates and store a spring force;
a sensor configured to determine a state of the strap according to the rotation direction of the rotating mechanism; and
a processor communicating with the sensor and configured to change an input mode of the electronic device according to the state of the strap,
wherein, the suspension device further comprises a limiting mechanism configured to limit the extent or amount of the strap passing through the first opening, the limiting mechanism is defined in the first opening, the limiting mechanism comprises a limiting block and a elastic sheet, the limiting block defines a receiving slot and a second hole, the elastic sheet has a "W" shape symmetrical structure and is received in the receiving slot, the strap passes through the receiving slot and is resisted on inner wall of the receiving slot by the elastic sheet, both the elastic sheet and the strap are partially located outside of the second hole.

8. The electronic device according to claim 7, wherein, when the strap is in a tensile state, the processor changes the electronic device to a full speech mode according to the tensile state; when the strap is in a shrinkage state, the processor changes the input mode of the electronic device to a character input mode.

9. The electronic device according to claim 7, further comprising another first receiving cavity and a second rotating mechanism, each of the first and second rotating mechanisms is received in a corresponding one of the first and the another first receiving cavities, the first end of the strap is wound on the first rotating mechanism, and the second end of the strap is wound on the second rotating mechanism.

10. The electronic device according to claim 7, wherein, the first rotating mechanism comprises a coil spring and a shaft, the shaft is defined in the first receiving cavity, the coil spring comprises a first end and a second end, the first end of the coil spring is fixed on the shaft and the coil spring is wound on the shaft, the second end of the coil spring is connected with one of the first and second ends of the strap and the strap is wound on the coil spring.

11. The electronic device according to claim 10, wherein, the first end of the coil spring defines a sheet metal, the shaft defines a second opening, the sheet metal is received in the second opening, the coil spring passes through the second opening and is wound on the shaft.

12. The electronic device according to claim 7, wherein, the shell defines a limiting groove, the limiting groove is located between the first hole and the first opening, the limiting groove is configured to receive the strap and restrict the moving direction of the strap along the limiting groove.

13. The electronic device according to claim 7, wherein, the shell can be a housing, the shell defines a second receiving cavity, the second receiving cavity is configured to receive some internal components of the electronic device.

14. The electronic device according to claim 13, wherein, the shell further defines a third receiving cavity, the third receiving cavity is configured to receive the sensor.

\* \* \* \* \*